United States Patent
Ashok et al.

(10) Patent No.: US 10,805,292 B2
(45) Date of Patent: Oct. 13, 2020

(54) SECURE AUTHENTICATION AND NETWORK ACCESS MANAGEMENT FOR MOBILE COMPUTING DEVICES

(71) Applicant: FMR LLC, Boston, MA (US)

(72) Inventors: Rohith Ashok, Medway, MA (US); Stein Eriksen, Jefferson, MA (US)

(73) Assignee: FMR LLC, Boston, MA (US)

( * ) Notice: Subject to any disclaimer, the term of this patent is extended or adjusted under 35 U.S.C. 154(b) by 201 days.

(21) Appl. No.: 15/898,686

(22) Filed: Feb. 19, 2018

(65) Prior Publication Data

US 2019/0260741 A1    Aug. 22, 2019

(51) Int. Cl.
*H04L 29/06* (2006.01)
*H04W 12/06* (2009.01)
*H04W 12/08* (2009.01)
*H04L 12/26* (2006.01)
*H04L 12/24* (2006.01)
*H04L 29/08* (2006.01)

(52) U.S. Cl.
CPC ...... *H04L 63/0876* (2013.01); *H04L 41/0803* (2013.01); *H04L 41/0816* (2013.01); *H04L 43/028* (2013.01); *H04L 43/0876* (2013.01); *H04L 43/0888* (2013.01); *H04L 63/083* (2013.01); *H04L 63/0861* (2013.01); *H04L 63/105* (2013.01); *H04L 67/141* (2013.01); *H04W 12/06* (2013.01); *H04W 12/08* (2013.01)

(58) Field of Classification Search
USPC ............ 726/6, 2, 21, 36; 713/150, 163, 181; 380/255, 264, 276
See application file for complete search history.

(56) References Cited

U.S. PATENT DOCUMENTS

| | | | | |
|---|---|---|---|---|
| 7,624,181 B2* | 11/2009 | Townsley | ............... | H04L 9/3271 709/225 |
| 2008/0279116 A1* | 11/2008 | Tuffin | .................... | H04L 67/306 370/254 |
| 2012/0331527 A1* | 12/2012 | Walters | ............... | G06F 21/6218 726/4 |
| 2014/0053234 A1* | 2/2014 | Barton | .................. | H04W 12/08 726/1 |
| 2015/0294377 A1* | 10/2015 | Chow | ................ | G06Q 30/0282 705/347 |

FOREIGN PATENT DOCUMENTS

WO        2012109867 A1    8/2012

* cited by examiner

*Primary Examiner* — Sharif E Ullah
(74) *Attorney, Agent, or Firm* — Proskauer Rose LLP (57) ABSTRACT

Methods and apparatuses are described for secure authentication and network access management for mobile computing devices. A server establishes a communications session with a mobile device. The server receives a network access request from the mobile device, the network access request including user access class data based upon authentication credentials provided by a user. The server determines a level of network access to provide to the mobile device based upon the user access class data. The server generates network configurations based upon the determined level of network access. The server applies the network configurations to the communications session with the mobile device. The server transmits an acknowledgment of the network access request to the mobile device. The mobile device routes network traffic originating from the mobile device to external network devices according to the applied network configurations.

26 Claims, 3 Drawing Sheets

FIG. 2 ts, laptop com-
SECURE AUTHENTICATION AND NETWORK ACCESS MANAGEMENT FOR MOBILE COMPUTING DEVICES

TECHNICAL FIELD

This application relates generally to methods and apparatuses, including computer program products, for secure authentication and network access management for mobile computing devices.

BACKGROUND

Mobile computing devices, such as tablets, laptop computers, and smartphones, have become ubiquitous in today's environment. The portability of these devices is enhanced by the near-universal availability of wireless communications networks (e.g., cellular, WiFi) that provide constant connectivity for mobile devices. A user (also called the 'main user') may have two or three such devices that are generally configured for that particular user, in that the security authentication credentials used to access the device (e.g., PIN, password) are unique to the main user, and the applications installed on the device are configured for use by the main user.

However, the main user may allow other users to use one or more of the devices—for example, a parent may let a child access the parent's smartphone to, e.g., play games, browse the web, and so forth. In this case, the other users may be considered 'semi-authorized,' meaning that the other users have the main user's permission to use the device generally, the main user may not want the other users to access all of the different functionality or applications on the device (e.g., private email, specific websites or web content, access to certain network segments, etc.).

In the case defined above, the mobile device is unaware that the user accessing the device functionality is not the main user, because the authentication credentials used to gain access to the device is the same across all users. As such, the mobile device provides the same level of device functionality access and external network access to the semi-authorized user as it would to the main user. Existing techniques such as device profiles do not overcome this deficiency because the semi-authorized user would use the same authentication credentials as the main user, and thus access the main user's profile—which provides the full level of access.

In this way, mobile devices are unable to implement varying levels of user-specific authentication—where a main user would have full access to the device functionality and external network paths, and a semi-authorized user would have partitioned access to specifically-defined functionality and external network paths (in some cases, without the ability to override such access).

SUMMARY

Therefore, what is needed are methods and systems for secure authentication and network access management for mobile computing devices, where the mobile devices implement a framework called vague factor authentication to enable specifically-tailored device access to semi-authorized users. In this context, vague factor authentication means that a semi-authorized user is allowed to use the device (e.g., because the semi-authorized user is able to provide an authentication credential such as a password, PIN, or even facial recognition) but the semi-authorized user is not the main user of the device (e.g., because there are additional authentication procedures like fingerprint recognition that the semi-authorized user cannot satisfy). The techniques described herein provide an advantageous system and methodology for implementing vague factor authentication in mobile devices to, e.g., segment a mobile device's network access and provide network-level content filtering based upon the identity of the user and/or a defined role or tier of the user.

Existing implementations are generally variants of a rule- and role-based system. For example, in these systems an employee is given a specific role, and an administrator sets that role to have X, Y and Z permissions. A user in that role either has access or they do not. If they do have access, anyone logged into their systems, regardless of authentication method, has the same access as the actual person. This is the in the case of someone looking over your shoulder and getting credentials. The specific techniques described herein enable the client device to give hints to the backend system as to how sure the client device is about the person's identity, thereby shifting the burden of access controls away from a rule-based system to a heuristic learning system.

One could envision a system much like the existing art, that leverages multiple roles per device, one per authentication type (e.g., password, fingerprint, face recognition, etc.). This could achieve similar initial goals, but it would come at a high cost of complexity and administration to setup, manage and monitor the multiple roles per actual user. The improvement of the systems and methods described herein is that they allow the client device to pass hints with minimal change to the client to the overlay network. The backend management systems can adjust the network to the user's access attempts based on the information it has historically collected for that user.

The invention, in one aspect, features a computerized method of secure authentication and network access management for mobile computing devices. A server computing device establishes a communications session with a mobile computing device. The server computing device receives a network access request from the mobile computing device, the network access request including user access class data generated by the mobile computing device based upon authentication credentials provided by a user of the mobile computing device. The server computing device determines a level of network access to provide to the mobile computing device based upon the user access class data. The server computing device generates one or more network configurations based upon the determined level of network access. The server computing device applies the one or more network configurations to the communications session with the mobile computing device. The server computing device transmits an acknowledgment of the network access request to the mobile computing device. The mobile computing device routes network traffic originating from the mobile computing device to one or more external network devices according to the applied network configurations.

The invention, in another aspect, features a system for secure authentication and network access management for mobile computing devices. The system comprises a server computing device that establishes a communications session with a mobile computing device. The server computing device receives a network access request from the mobile computing device, the network access request including user access class data generated by the mobile computing device based upon authentication credentials provided by a user of the mobile computing device. The server computing device determines a level of network access to provide to the mobile computing device based upon the user access class data. The server computing device generates one or more network configurations based upon the determined level of network access. The server computing device applies the one or more network configurations to the communications session with the mobile computing device. The server computing device transmits an acknowledgment of the network access request to the mobile computing device. The mobile computing device routes network traffic originating from the mobile computing device to one or more external network devices according to the applied network configurations.

Any of the above aspects can include one or more of the following features. In some embodiments, the network access request comprises a DHCP Discovery message. In some embodiments, the user access class data is stored in the User Class Data field of the DHCP Discovery message. In some embodiments, the acknowledgment comprises a DHCP Offer message.

In some embodiments, the user access class data comprises a role associated with a user of the mobile computing device. In some embodiments, the role indicates that the user of the mobile computing device has authenticated to the mobile computing device using biometric authentication data of the user. In some embodiments, the biometric authentication data of the user comprises at least one of a fingerprint, a retina scan, or a voice print.

In some embodiments, the role indicates that the user of the mobile computing device has authenticated to the mobile computing device using passcode data. In some embodiments, the passcode data comprises at least one of a username, a password, or a PIN. In some embodiments, the role indicates that the user of the remote computing device has not authenticated to the mobile computing device.

In some embodiments, the server computing device monitors the network traffic originating from the mobile computing device via the communications session according to the level of network access. In some embodiments, monitoring the network traffic comprises at least one of filtering the network traffic or logging the network traffic. In some embodiments, the one or more network configurations comprise a VLAN. In some embodiments, the server computing device automatically adjusts one or more of the level of network access or the network configurations based upon network traffic originating from the mobile computing device during the communications session.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
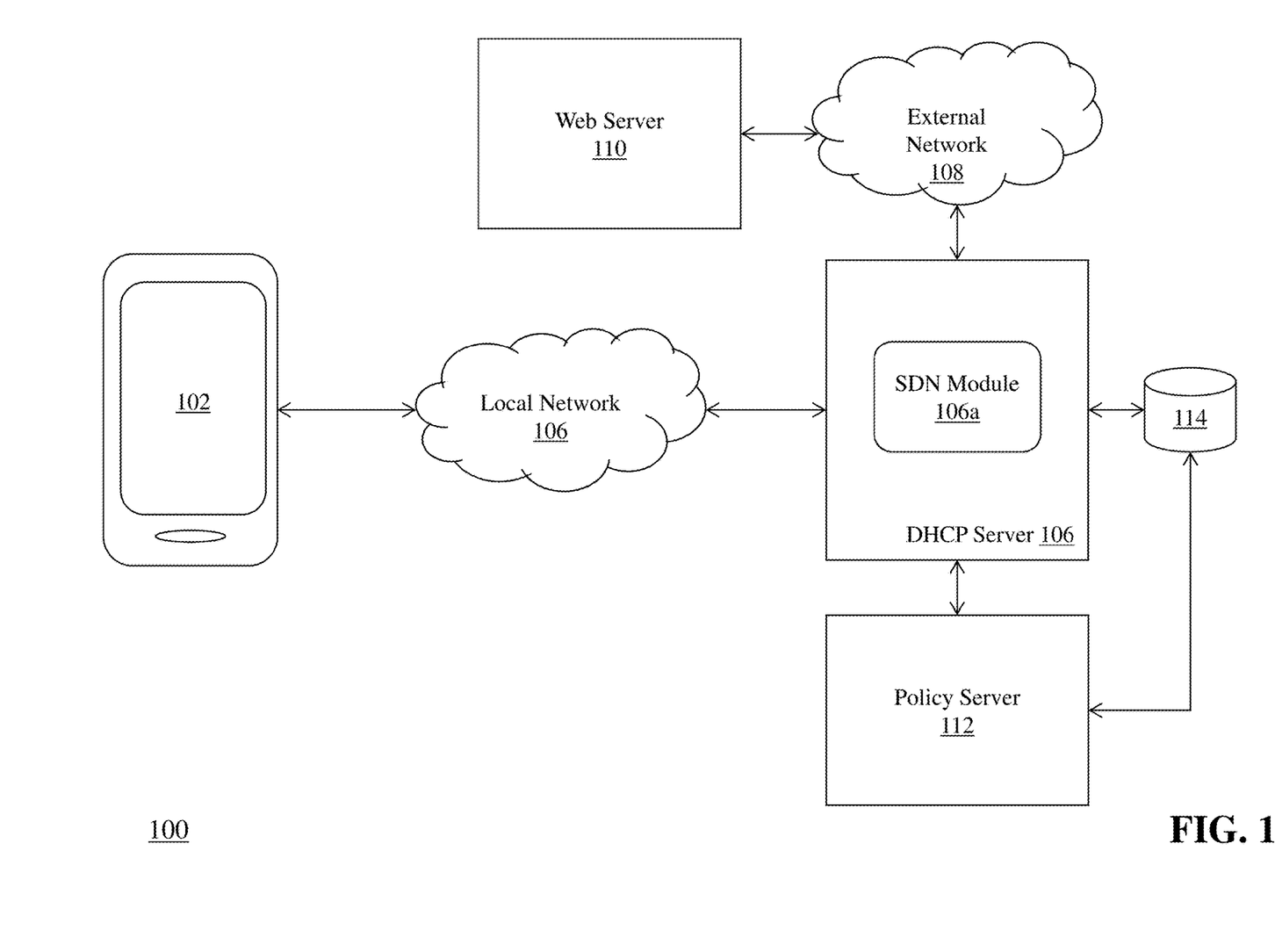
FIG. 1 is a block diagram of a system for secure authentication and network access management for mobile computing devices.

FIG. 1 is a block diagram of a system 100 for secure authentication and network access management for mobile computing devices. The system 100 includes a mobile computing device 102 that is coupled via local communications network 104 to Dynamic Host Configuration Protocol (DHCP) server 106. The DHCP server 106 executes a software-defined network (SDN) module 106a, and the DHCP server 106 is coupled to one or more external networks (e.g., such as network 108) that connects to one or more external computing device (e.g., web server 110), one or more server computing devices (such as policy server 112), and a database 114.

The mobile computing device 102 connects to the local communications network 104 in order to communicate with the DHCP server 106 to provide input and receive output (e.g., network packets) relating to the process of secure authentication and network access management for mobile computing devices as described herein. Exemplary mobile computing devices 102 include, but are not limited to, laptop computers, tablets, smartphones, smart watches, and internet appliances. It should be appreciated that other types of computing devices that are capable of connecting to the components of the system 100 can be used without departing from the scope of invention. Although FIG. 1 depicts a single mobile device 102, it should be appreciated that the system 100 can include any number of mobile devices.

The local communication network 104 enables the mobile device 102 of the system 100 to communicate with the DHCP server 106 in order to perform the process of secure authentication and network access management for mobile computing devices as described herein. In one embodiment, the local communications network 104 is a wireless or cellular LAN. In some embodiments, the network 104 is comprised of several discrete networks and/or sub-networks that enable the mobile device 102 and the DHCP server 106 to communicate with each other.

The DHCP server computing device 106 is a combination of hardware, including one or more special-purpose processors and one or more physical memory modules, and specialized software modules that are executed by a processor of the DHCP server 106, to receive data from other components of the system 100, transmit data to other components of the system 100, and perform functions for secure authentication and network access management for mobile computing devices as described herein. In some embodiments, the SDN module 106a and other software modules of the DHCP server 106 are specialized sets of computer software instructions programmed onto a dedicated processor in the DHCP server 106 and can include specifically-designated memory locations and/or registers for executing the specialized computer software instructions. The DHCP server 106 is configured to provide network address configuration, assignment, and management functionality to devices (such as mobile device 102) that connect to the DHCP server 106. In one embodiment, the DHCP server 106 sits as an intermediary between the mobile device 102 and other internal or external network resources (such as external network 108, web server 110, and policy server 112). The DHCP server 106 is configured to provide a network address (e.g., an IP address) to the mobile device 102 for use in establishing network connections to the remote network resources. Generally, the DHCP server 106 ensures that each client device has a different network address and manages the set of network addresses as new devices join the network, and existing devices leave the network.

It should be appreciated that, in some embodiments, the DHCP server 106 is configured as a scalable architecture. In these embodiments, the DHCP server 106 is immutable, all information is derived from the policy server 112 and all runtime information is stored in the policy server 112. As such, the DHCP server 106 can be setup as a simple cluster where at least two servers are always running. If one of these servers gives trouble, the underlying platform (e.g., a cloud) can kill the server and create a new one. On startup of a new DHCP server, the server contacts the policy server 112 at a fixed network address and loads any configuration information needed. While the DHCP server 106 is part of the main network, once a mobile device 102 has an IP address, that device continues to work until the IP TTL expires, so momentary lapses in DHCP availability are acceptable. In most cases however, at least two DHCP servers would run to ensure a good level of availability. More servers could be run if needed. Client devices, such as mobile device 102, discover and the first DHCP server to answer wins, any others will be ignored.

In some embodiments, the DHCP server 106 also leverages a software-defined network (SDN) module 106a that includes an SDN data plane and controller architecture to dynamically and rapidly change the network layout and network access for the connecting devices, such as mobile device 102. For example, the DHCP server 106 can generate and provide to mobile device 102 an IP address that is part of a software-defined network overlay controlled by the SDN module 106a. In this example, the IP address is not a standard layer 3 physical network IP address. Further details on the SDN module 106a and its exemplary functionality are provided throughout the specification.

The external communications network 108 connects the DHCP server 106 to other remote computing resources, such as web server 110. In one embodiment, the external communications network 108 is a wide area network (WAN) such as the Internet. In some embodiments, the external network 108 is comprised of several discrete networks (e.g., cellular, Internet) and/or sub-networks that enable the DHCP server 106 to communicate with remote computing resources.

The web server 110 is a computing device (or, in some embodiments, a plurality of devices) that hosts a website, to which the mobile device 102 connects to retrieve and display webpage content. Typically, the website comprises a plurality of visual and non-visual elements that make up the content transmitted and displayed to a user when, e.g., browser software on the mobile device 102 connects to the web server 110 via local communications network 104, DHCP server 106, and external communications network 108, and requests content from the website. The elements of a website include, but are not limited to, webpages (e.g., HTML documents), image files, layouts, color sets, stylesheets, document object models (DOM), tracking elements, instrumentations (e.g., analytics, advertisement display, etc.), metadata, URLs, advertisements, and content (e.g., text, audio, video). Exemplary browser software includes, but is not limited to, Mozilla Firefox™ available from Mozilla Corp., Google Chrome™ available from Google Inc., and Safari available from Apple, Inc.

The policy server 112 is a computing device (or, in some embodiments, a plurality of devices) that contains a centralized repository of network access rules and policies for users/devices; the policy server 112 communicates with the DHCP server 106 to implement network changes, network restrictions, overlays and other similar network configurations as part of the process of secure authentication and network access management for mobile computing devices as described herein. In one example, the policy server 112 contains defined mappings that relate a user identifier (e.g., user company ID, login name, etc.) to a specific role and network access level. As will be explained in greater detail below, the mappings can be stored in a database table, in-memory cache, or other data storage paradigm for use by the policy server 112 and DHCP server 110.

In some embodiments, the policy server 112 is similarly imaged as a cloud-based server with a REST API front end, an external data storage (S3 style), a cloud database and a bigdata (Hadoop/Spark) service behind it. The REST APIs are used for communication with the DHCP server 106. The data storage is persistent storage for information in case the API Servers go down. The cloud database is used to store rules, SDN overlays and other information. Finally, the bigdata service is used to process incoming information.

The database 114 comprises transient and/or persistent memory for data storage that is used in conjunction with the process for secure authentication and network access management for mobile computing devices as described herein described herein. Generally, the database 114 is configured to receive, generate, and store specific segments of data for use by the DHCP server 106. In some embodiments, all or a portion of the database 114 can be integrated within the DHCP server 106, or be located on a separate computing device or devices. For example, the database 114 can comprise a database such as MySQL™ available from Oracle Corp. of Redwood City, Calif.

Figure 2:
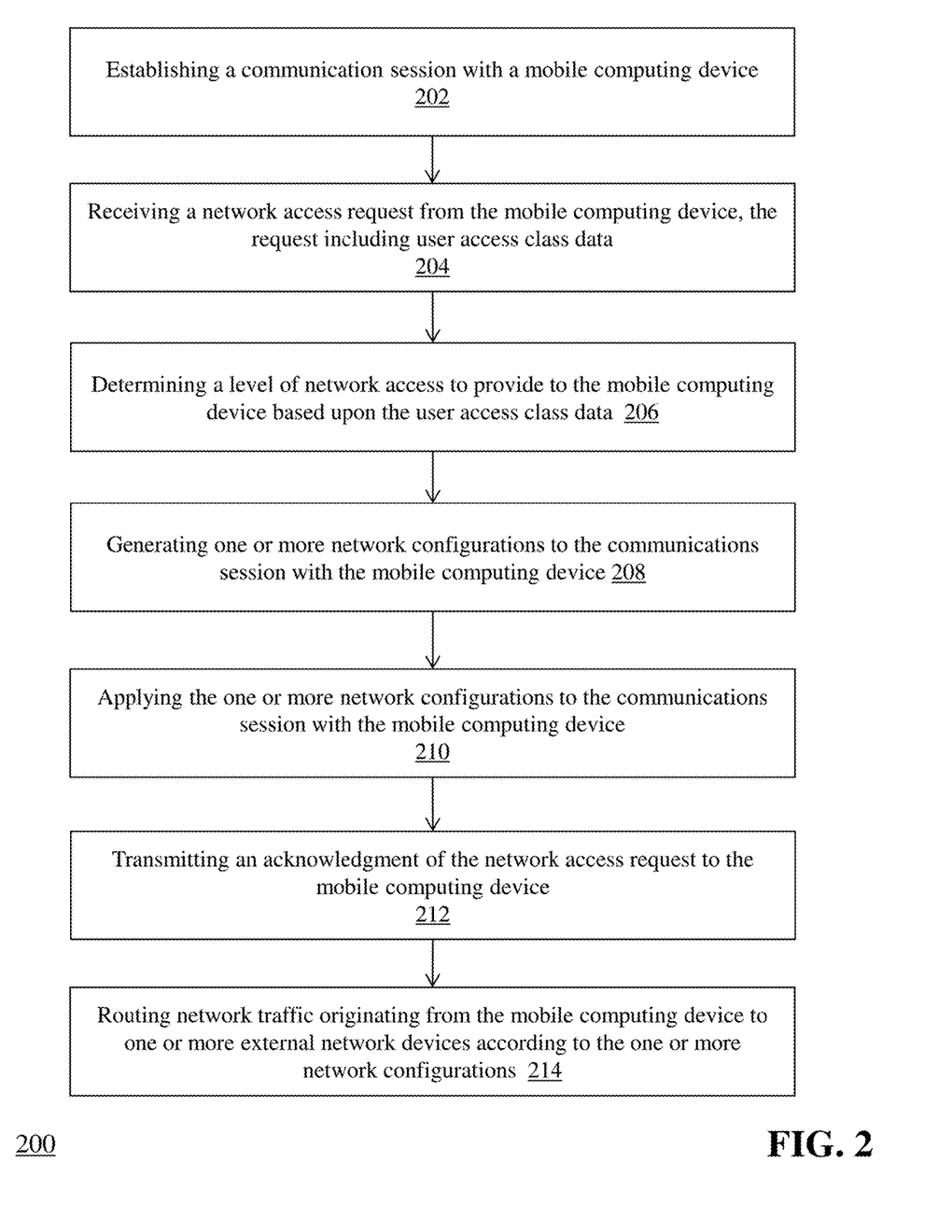
FIG. 2 is a flow diagram of a computerized method of secure authentication and network access management for mobile computing devices.

FIG. 2 is a flow diagram of a computerized method 200 of secure authentication and network access management for mobile computing devices, using the system 100 of FIG. 1. The DHCP server 106 establishes (202) a communication session with the mobile computing device 102 and receives (204) a network access request from the mobile device 102—where the network access request includes user access class data generated by the mobile device 102 based upon authentication credentials provided by a user of the mobile device. In one embodiment, a user authenticates to the mobile device 102 by providing one or more authentication credentials, and then activates functionality on the mobile device 102 that requires access to network resources (e.g., web server 110). As part of the functionality being activated, networking hardware in the mobile device 102, in conjunction with the operating system of the mobile device 102, initiates a connection to DHCP server 106 via local network 104 in order to, e.g., obtain a network address to communicate with external network resources. The communication between the mobile device 102 and the DHCP server is originally DHCP, which is a UDP protocol. (see, e.g., https://en.wikipedia.org/wiki/Dynamic_Host_Configuration_Protocol). This shifts to a standard TCP/IP once the IP address is constructed. There are no limitations on the mobile device 102, other than what is imposed by the SDN network via the policy server. Given this is an SDN, the mobile device 102 is not able to sniff traffic and access the true physical network under the SDN, as the mobile device 102 would not have access and would not even know it is on an SDN. Any standard network protocols can be used unless the policy server prevents them. As part of the DHCP Protocol exchange (step 204), the user class data is sent to the DHCP server 106. The DHCP server 106 forwards this on to the policy server 112, which assists in the assignment of the IP addresses and communications with the SDN to build the overlay network (as described below).

The DHCP server 106 determines (206) a level of network access to provide to the mobile device 102 based upon the user access class data and generates (208) one or more network configurations based upon the determined level of network access. In some embodiments, the policy server 112 and the SDN module 106a communicate over a TCP/IP connection, leveraging REST APIs to work out the correct SDN overlay. The policy server 112 constructs the final overlay determination and leverages the SDN module 106a to build the overlay. The communication with the SDN depends on the implementation, although most leverage REST APIs.

The DHCP server 106 applies (210) the network configurations to the communications session with the mobile device 102, and transmits (212) an acknowledgment of the network access request to the mobile device 102. The application of the overlay is transparent and hidden from the mobile device 102, in some embodiments, the mobile device 102 just sees an IP address in the DHCP offer as would be the case with any other client and from any other DHCP server. The mobile device 102 at no point knows what type of network overlay the SDN/policy server determined. Once the request has been sent officially by the client (step three in DHCP), the overlay is confirmed and the acknowledgement sent back. The overlay will have already been constructed before the offer is sent by the DHCP server 106.

The mobile device 102 routes (214) network traffic originating from the mobile device 102 to one or more external network devices according to the applied network configurations. The mobile device 102 does not notice any of the routing or network changes and continues to use the network as it would expect. The controls or alerts are enacted by the policy server 112 as appropriate with communication with the SDN module 106a.

Figure 3:
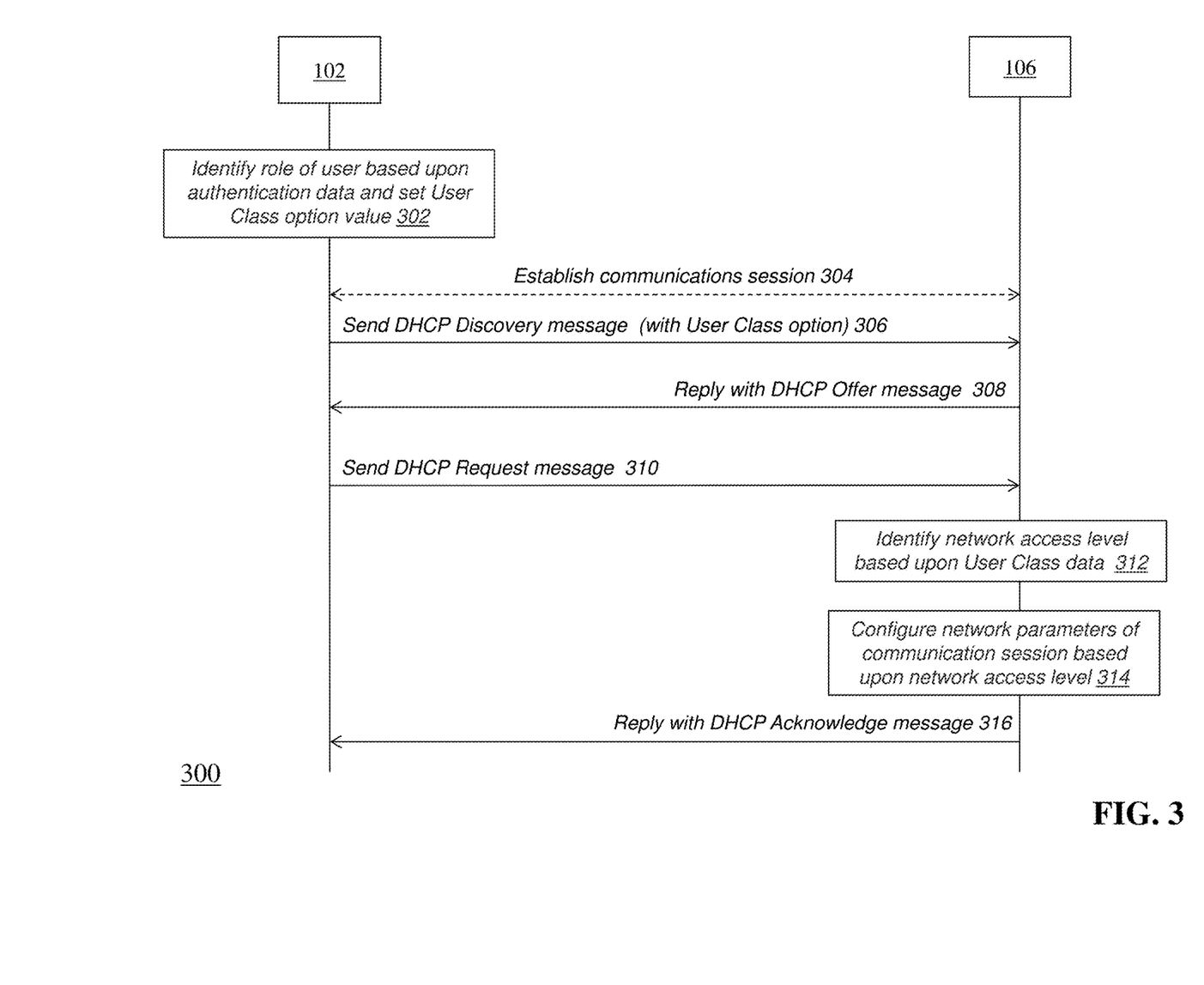
FIG. 3 is a ladder diagram depicting an exemplary exchange of DHCP messages between the mobile device and the DHCP server.

FIG. 3 is a ladder diagram depicting a detailed exchange of DHCP messages between the mobile device 102 and the DHCP server during the method 200 as described above. As shown in FIG. 3, the mobile device 102 identifies (302) a role of a user of the mobile device 102 based upon authentication data for the user. The mobile device 102 is configured with a software module that both determines the role of a user who is authenticating to the mobile device 102 and translates the role into appropriate User Class Data, which is then transmitted to the DHCP server 106 in packets using the User Class option (as explained below). For example, the user roles can be assigned as follows:

Role A (Owner)—a user who has authenticated using a "personal" biometric authentication method, such as a fingerprint, a retina scan or a voice print. Such biometrics are unique to a single person, and these biometrics identify the user authenticating to the mobile device 102 as the main user, or owner, of the device. The mobile device 102 can be equipped with hardware, or coupled to hardware, that captures these biometrics (e.g., a fingerprint reader, a scanner, a microphone), generates a digital representation of the biometrics, and analyzes the digital representation to identify the user. In some embodiments, the mobile device 102 is equipped to analyze the digital representation locally (e.g., using comparison data stored in local storage). In some embodiments, the mobile device 102 communicates with a remote computing resource (e.g., authentication server) to confirm the identity of the user based upon the biometric data.

Role B (Semi-Authorized)—a user that has provided non-biometric authentication data, typically given to them from the owner of the device (e.g., the owner's password/PIN, or a guest password/PIN provided by the user). As noted previously, such users are considered semi-authorized because they have provided authentication data to the mobile device 102 that is 'shareable' and may be further shared—in contrast to biometrics such as a fingerprint, a retina scan, or a voice print which are 'unshareable' (i.e., fixed to a single person).

Role C (Guest)—this is an optional role, where the mobile device 102 may allow a user to authenticate but the user is significantly restricted in what he or she can access in the device and on the network to which the device is connected. In this case, generally the mobile device 102 can be configured to accept a common 'guest' PIN/password etc.—in some embodiments, the mobile device 102 does not require any authentication credentials.

It should be appreciated that other roles can be defined and implemented in the methods and systems described herein.

Once the mobile device 102 has determined the role of the user who has authenticated to the mobile device 102, the mobile device 102 sets (302) the User Class option value of DHCP to correspond to the identified user role.

The mobile device establishes (304) a communications session with DHCP server 106. The mobile device 102 sends (306) a DHCP Discovery message to DHCP server 106. As noted above, the DHCP Discovery message includes a value, set by the mobile device 102 in step 302, in the User Class option of at least one packet transmitted between the mobile device 102 and the DHCP server 106. The User Class option (as described in the DHCP Options RFC—https://tools.ietf.org/html/rfc3004) enables DHCP administrators to define specific user class identifiers to convey information about a client's software configurations or about its user's preferences.

The format of the User Class option is:

```
 Code   Len   Value
+------+----+------------------+ • • • —+
|  77  |  N | User Class Data ('Len' octets) |
+------+----+------------------+ • • • —+
```

Where Value consists of one or more instances of User Class Data. It should be appreciated that a DHCP server that is not configured or equipped to interpret any given user class specified by a client device must ignore the user class.

When the DHCP server 106 receives the DHCP Discovery message with User Class Data that the DHCP server 106 recognizes, the DHCP server 106 replies to the mobile device 102 with a standard DHCP Offer message (308). In turn, the mobile device 102 sends (310) a DHCP Request message to the DHCP server 106. Upon receiving the DHCP Request, the DHCP server 106 identifies a network access level for the mobile device 102 based upon the User Class Data received in the DHCP Discovery message.

To identify the network access level, the DHCP server 106 can leverage the functionality of the policy server 112 to retrieve one or more network access configuration parameters, corresponding to the User Class Data, that should be applied to the communications session. In one example, the policy server 112 maintains a set of mappings that associates a defined user identifier (e.g., company ID, login name) to one or more roles as defined by the User Class Data. Each user identifier-role mapping is then mapped to specific network access configuration parameters. In some embodiments, the user identifier is also mapped to one or more device identifiers of the mobile device 102 (e.g., MAC address, serial number, etc.).

An example of the policy server 112 mapping is as follows:

<User Identifier>→<Role(s) available for User Identifier (e.g., Owner, Semi-Authorized, Guest)>;
    <User Identifier>→<Owner>→<Accessible Networks (e.g., specific subnets/segments)>;
    <User Identifier>→<Owner>→<Accessible Endpoints (e.g., specific DNS/IP)>;
    <User Identifier>→<Semi-Authorized>→<Accessible Networks (e.g., limited)>;
    <User Identifier>→<Semi-Authorized>→<Accessible Endpoints (e.g., limited)>;
    <User Identifier>→<Guest>→<Accessible Networks (e.g., none)>;
    <User Identifier>→<Guest>→<Accessible Endpoints (e.g., none)>;
    <User Identifier>→<Device Identifier>.

The Accessible Networks section contains information pertaining to specific network subnets/segments to which the user identifier-role mapping is permitted access, what time or time range the specific network subnets/segments are accessible by the user identifier-role mapping, a log or record of the most recent access by the user identifier-role mapping, and so forth.

The Accessible Endpoints section contains information pertaining to specific IP addresses and server/machine endpoints both within the local network 104 and in external networks (e.g., network 108) to which the user identifier-role mapping is permitted access, what time or time range IP addresses and server/machine endpoints are accessible by the user identifier-role mapping, a log or record of the most recent access by the user identifier-role mapping, how much data has been transferred for a given time range, and so forth. Also, in some embodiments, the Accessible Endpoints section includes information relating to security criticality of the endpoints as derived from, e.g., an internal software asset database.

In some embodiments, the Accessible Networks and Accessible Endpoints sections can include network configuration information, such as whitelists and/or blacklists for network resources (e.g., internal directories, public-facing internal resources, Internet-based resources).

In some embodiments, the policy server 112 comprises a data analytics function that processes the incoming data to determine deviations from expected or normal activity. The policy server 112 can:

Compare any inflight network endpoint connections against an established baseline. If the connections are within a standard deviation of the current time/data transfer volume, the policy server 112 can consider this new feedback into the norm. If the access is outside the standard deviation, an alert will be sent.

Compare the history of access for this specific mobile device 112 against a given endpoint and role/user. As mentioned above, some users may have multiple mobile devices and this mobile device could have never or rarely access a specific endpoint. This would trigger an alert.

Compare the endpoint and access history of the current mobile device 112 or user, with other devices/users within the same job role, the same team within their organization, and/or also a similar level of access. This is to determine if the endpoint being sought is beyond the typical job role or level and would require explicit authorization and/or alerting.

When the DHCP server 106 has identified the network access level to allocate to the mobile device 102, the DHCP server 106 configures (314) network parameters of the communication session with the mobile device 102 based upon the network access level. Examples of network configuration outcomes are as follows (it should be appreciated that the DHCP server 106 can use varying combinations or aspects of these outcomes):

1) Restrict access to only external network access points—similar to a guest wireless account, the mobile device 102 may not have any access to internal network endpoints or systems, but the mobile device 102 may have access to remote, publicly-accessible external networks or resources (e.g., web server 110 on Internet).

2) Restrict access to only external network access points with monitoring—similar to the previous example where the mobile device 102 has access to only external network or resources; however, in this example the network/DNS server 106 is logging and monitoring the network connections initiated by the mobile device 102 for auditing purposes and "allowed" software access reasons. In this example, the external network access can be restricted by, e.g., DNS server, IP Address or content and also may take into account the user class to determine which resources for the mobile device to access.

3) Allow limited internal access (with/without either class of external access noted above)—an example may be a temporary contractor who needs access to specific computing systems and resources. The DHCP server 106 can grant access to the contractor's mobile device 102 to a limited set of internal computing resources via IP/routing/VLAN. This approach adds to the network security that is already there in terms of LAN ID/Password. In addition, the controls in this approach follow the user to any system he or she uses\

4) Allow only internal access—an example may be a contractor working on a very secure/private project where he or she should not have any external access (to prevent unintended or unauthorized release of secure information to external networks) but only limited or normal internal access to certain computing systems or devices.

Once the DHCP server 106, in conjunction with the policy server 112, has selected a network configuration outcome, the SDN module 106a of the DHCP server 106 can generate one or more virtual network overlays as part of step 314, and apply the generated virtual network overlays to the connection with the mobile device 102 to customize the network access of the mobile device.

Examples of such virtual network overlays include, but are not limited to:

VLAN—A VLAN divides physical networks at specific switch ports or routers. The SDN module 106a leverages dynamic VLANs to specifically control the access from the mobile device's MAC Address through the network. This would prevent access to unauthorized systems at a switch port level.

Active Filtering—Once the SDN module 106a has established a VLAN/Dynamic VLAN, all traffic from the mobile device 102 going through that VLAN can be actively logged and filtered—without impacting other traffic on the network.

DNS—Once a mobile device 102 (in a semi-authorized role) has been identified and given an IP Address, the SDN module 106a can configure the DNS server 106 to also keep track of DNS requests made by the mobile device 102 to see if any are not expected. The DNS request tracking information can be fed into a machine learning system (described below) as new requests are made.

IP Address request—The SDN module 106a can configure the DNS server 106 to watch for specific SYN packets from one or more mobile devices 102 that may be identified for further analysis. If network resources and/or systems are to be blocked, the DNS server 106 can discard SYN packets to authorized systems and not allow them. Information relating to the requesting of IP Addresses can also be fed into the machine learning system (described below). Similar inspection could be done for UDP and Multicast packets.

As noted above, in some embodiments the SDN module 106a of the DHCP server 106 can be coupled to a machine learning analysis module to watch access trends and network locations. The machine learning analysis module can collect and track information such as time of access of a network resources, mobile device (i.e., IP address) that accessed the network resource, the role that accessed the network resource, and other mobile device-side parameters such as laptop/device information. The machine learning module can then train a bayesian network with a large number of "good" examples in order to differentiate and determine concerning ones, which are then fed to the SDN module 106a for implementation of remedial measures. In one example, the SDN module 106a and the machine learning analysis module can keep tracking connections made by certain roles (i.e., semi-authorized devices) to see what they are doing, while also leveraging DNS servers that track the requests or network overlays that watch routes accessed.

The machine learning analysis module can track time of access, system (IP address) accessed, role that accessed it, and other client-side parameters such as laptop/device information. The machine learning analysis module uses an anomaly detection algorithm to isolate events that are outside of the standard (see, e.g., https://en.wikipedia.org/wiki/Anomaly detection). In some embodiments, the algorithms used within the system are local outlier factor or Naive Bayes, depending on speed vs. dataset size. If the trained data is lost, the machine learning portion of the policy server 112 would have to be retrained.

The system can be initially trained with the following inputs, so future events would add to the training:
Inputs:
Time;
System Identifiers (IP Address, MAC Address);
User Information (biometrics, etc.);
Device Information (location);
Network Resources Access Attempted.
Outcome:
Access: Approved, Warned, Denied.

In one example, the initial training setup focuses on the employees' standard hours (8 am-6 pm for example), with an outcome of approved, slightly outside that range (7 am-8 am/6 pm-7 pm) with an outcome of warning and outside the warning range (8 pm-6 am) as denied. The system can also be trained with biometrics as outcome of approved and passwords as an outcome of warning.

The administrators of the system are able to set initial learning rules. The key is as more events are generated the more information is fed into the anomaly detection engine the more information it has to make future decisions. The administrators can decide that part of the user information is the person's role within the company (e.g., CEO, VP, Contractor, etc.), as that role may play a larger part in denial of access for specific systems in case those employees are more lax with security than others or their job presents a larger risk of invalid access, such as frequent travel or working insecure environments or localities.

Over time, the machine learning analysis module can learn as access was denied and then approved by a manager; as this information can be automatically retrained into the machine learning analysis module so future access of a similar type would no longer be considered an outlier.

The second part of the system is a strict rule-based system that administrators can use to enforce rules regardless of the training. The second system is needed in cases where an absolute decision is made and the system while involved does not really have a judgement call. The administrator has the option to train this rules into the system or not.

Some sample rules may include the following, as explained in use cases:

Bob is being fired on Friday for poor job performance. The HR system automatically interacts with the policy server 112 to restrict is access to warn or alert for the week before in case Bob finds out early and decides to do something malicious.

The policy server 112 uses a rule here instead of machine learning training, because Bob is an outlier himself and it is preferable not to train the overall system about HR rules, so instead a rule is set.

Susan is on vacation and brought her work laptop just in case, but it was somewhat damaged in transit. A major problem came up with a project, so Susan has to log in on vacation. However, her facial recognition system was damaged and could not recognize Susan. Susan is using her password from the Azores, so her geographic location was very far away from her normal workplace in Boston. Rather than train this exception into the network, the administrator added a rule valid for only one week to allow Susan to login using her password for specific hours—but would deny access to that system otherwise until she returns and can re-establish normal hours, location and system.

The policy server 112 uses a rule here because the situation was a one-off that is preferable not to train in, however if Susan continues her yearly trip to the Azores the system can be trained to recognize that location as valid.

Turning back to FIG. 3, once the network parameters of the communication session are configured, the DHCP server 106 replies (316) to the prior DHCP request message with a DHCP acknowledgement message. At this point, the network parameters of the communications session are configured according to the particular role assigned to the mobile device 102 and the mobile device 102 can access either internal network resources and/or external network resources according to the configuration.

The following is an exemplary use case of the systems, methods, and techniques for secure authentication and network access management for mobile computing devices as described herein.

In this use, case, Steve the finance analyst and Rob the somewhat rogue employee are tasked to work on some financial projections for the coming year. Steve has direct access to the corporation's internal finance operations computing system and shares with Rob some select information that is pertinent to their project.

Steve normally logs into his laptop using his fingerprint scanner, but software that enables the laptop to connect to the internal finance operations computing system requires a password to be entered. Rob once watched Steve enter his password and knowing his username from his email address now has sufficient credentials to login to the finance operations computing system as "Steve".

Rob decides to poke around and see what he can find. Rob could do one of the following things:
- Login to Rob's own laptop using Steve's username and password, and pretend to be Steve;
- Login to Rob's own laptop using his personal credentials, but access the finance operations computing system using a SQL connection with Steve's credentials;
- Login to Steve's laptop once when Steve left for the day and pretend to be Steve.

The DHCP server 106 and SDN module 106a can make different network routing decisions based off those three possible scenarios:

Outcome 1: When Rob used Steve's credentials on his own (Rob's) laptop, the DHCP server 106 noticed that the laptop—which has always been used by Rob—is suddenly trying to connect to a system (i.e., the finance operations computing system) that the laptop has never accessed before. As defined above, Rob's laptop can include a semi-authorized user class in the DHCP Discovery message, and as such, the DHCP server 106 can consider this 'vague' access because the wrong client device (i.e., Rob's laptop) was used with only a password, and not with biometrics such as fingerprint scans. The SDN module 106a can flag this as concerning and depending on Rob's own original role can do the following:
- Given the vagueness of the access, an initially selective IP address with more limited network resource access is assigned to Rob's laptop—for example, not the full access of Steve's role as finance analyst, closer to Rob's role due to the device being used to access the network.
- Alert Steve's manager of a new system access, while allowing access to continue.
- Alert Steve's manager of a new system access and deny access until Steve's manager decides to grant it.

The goal here is to alert Steve's manager of a change in behavior that might be concerning. If this is happened for some reason that is acceptable, the manager could allow it, in which case the routing to that IP Address assigned to the laptop would be expanded back as expected.

Outcome 2: When Rob uses his own credentialed laptop to access the finance operations computing system (a system that Rob's laptop has never accessed before) using a SQL connection with Steve's credentials, the following things may happen:
- Rob's laptop inserts a semi-authorized user class into the DHCP Discovery message (as described above), and as such, the SDN module 106a and DHCP server 106 detect that this is vague access because it is the first time that the finance operations computing system has been accessed from Rob's laptop using Steve's credentials, and without the biometric authentication of Steve's fingerprint scans.
- The DHCP server 106 blocks Rob's laptop from connecting to the finance operations computing system (e.g., by intercepting traffic intended for the system and discarding it) because Rob's role and history does not include access to the finance operations computing system.

In some cases, Rob's manager is alerted to the attempt. The system may allow connection access and notify management given how the role was setup. This may be intentionally allowed in the role/system to allow partial access to gain proof of illicit access.

Because the network only knew Rob was accessing a system he had not accessed before and was outside his role, only Rob's manager could be notified. The use of Steve's credentials would not be detected as that is within the JDBC connection information. It would not typically be possible to scan all connection information, however if the firm felt a specific ID was stolen the system could scan for that specifically.

Outcome 3: When Rob uses Steve's own laptop with Steve's credentials—but not the fingerprint scan, Steve's laptop is configured to insert a semi-authorized user class in the DHCP Discovery message, and as such, the SDN module 106a and the DHCP server 106 know this is a vague access attempt.
- Given the expected time of day and the lack of fingerprints, the DHCP server 106 and SDN module 106a can prevent routing of network traffic from Steve's laptop to the finance operations computing system.
- In some embodiments, an email can be sent to Steve's manager to alert him.

It is possible that Steve's laptop fingerprint scanner has broken, in which case the other login credentials (username, password) would have been Steve's only option to log in. This scenario would make the access valid, but it may still need to be confirmed by a third party such as Steve's manager, which the email alerting would allow.

In this case, the vague attempt is always blocked to serve as a secondary protection to ensure some other validity check has been performed. An email to a manager to ask if the attempt was valid and whether the fingerprint sensor was broken would lead them to be concerned about unauthorized access.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of secure authentication and network access management for mobile computing devices, the method comprising:

establishing, by a server computing device, a communications session with a mobile computing device;

receiving, by the server computing device, a network access request from the mobile computing device, the network access request comprising a DHCP Discovery message including user access class data generated by the mobile computing device based upon authentication credentials provided by a user of the mobile computing device, the user access class data comprising one of an authorized user class, a semi-authorized user class, or a guest user class;

determining, by the server computing device, a set of network access configuration parameters to provide to the mobile computing device based upon the user access class data, comprising:

determining a user identifier based at least one of the authentication credentials or a device identifier of the mobile computing device, and identifying the set of network access configuration parameters by mapping a combination of the user access class data and the user identifier to a network access configuration database;

applying, by the server computing device, the set of network access configuration parameters to the communications session with the mobile computing device;

transmitting, by the server computing device, an acknowledgment of the network access request to the mobile computing device;

routing, by the mobile computing device, network traffic originating from the mobile computing device to one or more external network devices according to the applied set of network access configuration parameters; and monitoring, by the server computing device, the network traffic originating from the mobile computing device via the communications session according to the set of network access configuration parameters.

2. The method of claim 1, wherein the user access class data is stored in the User Class Data field of the DHCP Discovery message.

3. The method of claim 1, wherein the acknowledgment comprises a DHCP Offer message.

4. The method of claim 1, wherein the user access class data comprises a role associated with a user of the mobile computing device.

5. The method of claim 4, wherein the role indicates that the user of the mobile computing device has authenticated to the mobile computing device using biometric authentication data.

6. The method of claim 5, wherein the biometric authentication data comprises at least one of a fingerprint, a retina scan, or a voice print.

7. The method of claim 4, wherein the role indicates that the user of the mobile computing device has authenticated to the mobile computing device using passcode data.

8. The method of claim 7, wherein the passcode data comprises at least one of a username, a password, or a PIN.

9. The method of claim 4, wherein the role indicates that the user of the mobile computing device has not authenticated to the mobile computing device.

10. The method of claim 1, wherein monitoring the network traffic comprises at least one of filtering the network traffic or logging the network traffic.

11. The method of claim 1, wherein the server computing device automatically adjusts the set of network access configuration parameters based upon network traffic originating from the mobile computing device during the communications session.

12. A system for secure authentication and network access management for mobile computing devices, the system comprising a server computing device that:

establishes a communications session with a mobile computing device;

receives a network access request from the mobile computing device, the network access request comprising a DHCP Discovery message including user access class data generated by the mobile computing device based upon authentication credentials provided by a user of the mobile computing device, the user access class data comprising one of an authorized user class, a semi-authorized user class, or a guest user class;

determines a set of network access configuration parameters to provide to the mobile computing device based upon the user access class data, comprising:

determining a user identifier based at least one of the authentication credentials or a device identifier of the mobile computing device, and identifying the set of network access configuration parameters by mapping a combination of the user access class data and the user identifier to a network access configuration database;

applies the set of network access configuration parameters to the communications session with the mobile computing device;

transmits an acknowledgment of the network access request to the mobile computing device;

wherein the mobile computing device routes network traffic originating from the mobile computing device to one or more external network devices according to the set of applied network access configuration parameters; and wherein the server computing device monitors the network traffic originating from the mobile computing device via the communications session according to the set of network access configuration parameters.

13. The system of claim 12, wherein the user access class data is stored in the User Class Data field of the DHCP Discovery message.

14. The system of claim 12, wherein the acknowledgment comprises a DHCP Offer message.

15. The system of claim 12, wherein the user access class data comprises a role associated with a user of the mobile computing device.

16. The system of claim 15, wherein the role indicates that the user of the mobile computing device has authenticated to the mobile computing device using biometric authentication data.

17. The system of claim 16, wherein the biometric authentication data comprises at least one of a fingerprint, a retina scan, or a voice print.

18. The system of claim 15, wherein the role indicates that the user of the mobile computing device has authenticated to the mobile computing device using passcode data.

19. The system of claim 18, wherein the passcode data comprises at least one of a username, a password, or a PIN.

20. The system of claim 15, wherein the role indicates that the user of the mobile computing device has not authenticated to the mobile computing device.

21. The system of claim 12, wherein monitoring the network traffic comprises at least one of filtering the network traffic or logging the network traffic.

22. The system of claim 12, wherein the server computing device automatically adjusts the set of network access configuration parameters based upon network traffic originating from the mobile computing device during the communications session.

23. The method of claim 1, further comprising:

tracking, by the server computing device, data during the communications session, the data including the user access class data, the set of network access configuration parameters, the user identifier, one or more parameters identifying the mobile computing device, and one or more attributes of network resources accessed or attempted for access by the mobile computing device;

generating, by the server computing device, one or more machine learning training examples using the tracked data;

training, by the server computing device, a Bayesian network using the generated machine learning training examples as input to identify network access events that are anomalous; and analyzing, by the server computing device, subsequently-generated network traffic originating from the mobile computing device using the trained Bayesian network to determine whether a network access event in the subsequently-generated network traffic is anomalous; and adjusting, by the server computing device, the network access configuration database based upon the analysis of the subsequently-generated network traffic to prevent anomalous network access events.

24. The system of claim 12, wherein the server computing device:

tracks data during the communications session, the data including the user access class data, the set of network access configuration parameters, the user identifier, one or more parameters identifying the mobile computing device, and one or more attributes of network resources accessed or attempted for access by the mobile computing device;

generates one or more machine learning training examples using the tracked data;

trains a Bayesian network using the generated machine learning training examples as input to identify network access events that are anomalous; and analyzes subsequently-generated network traffic originating from the mobile computing device using the trained Bayesian network to determine whether a network access event in the subsequently-generated network traffic is anomalous; and adjusts the network access configuration database based upon the analysis of the subsequently-generated network traffic to prevent anomalous network access events.

25. The method of claim 1, wherein applying the set of network access configuration parameters to the communications session with the mobile computing device comprises:

generating, by the server computing device, a virtual network overlay based upon the set of network access configuration parameters; and applying, by the server computing device, the virtual network overlay to the established communication session with the mobile computing device to customize network access of the mobile computing device.

26. The system of claim 12, wherein when applying the set of network access configuration parameters to the communications session with the mobile computing device, the server computing device:

generates a virtual network overlay based upon the set of network access configuration parameters; and applies the virtual network overlay to the established communication session with the mobile computing device to customize network access of the mobile computing device.

\* \* \* \* \*